March 28, 1961     H. A. AUSTIN     2,977,205
FUEL ECONOMIZER FOR INTERNAL COMBUSTION ENGINES
Filed Jan. 26, 1959
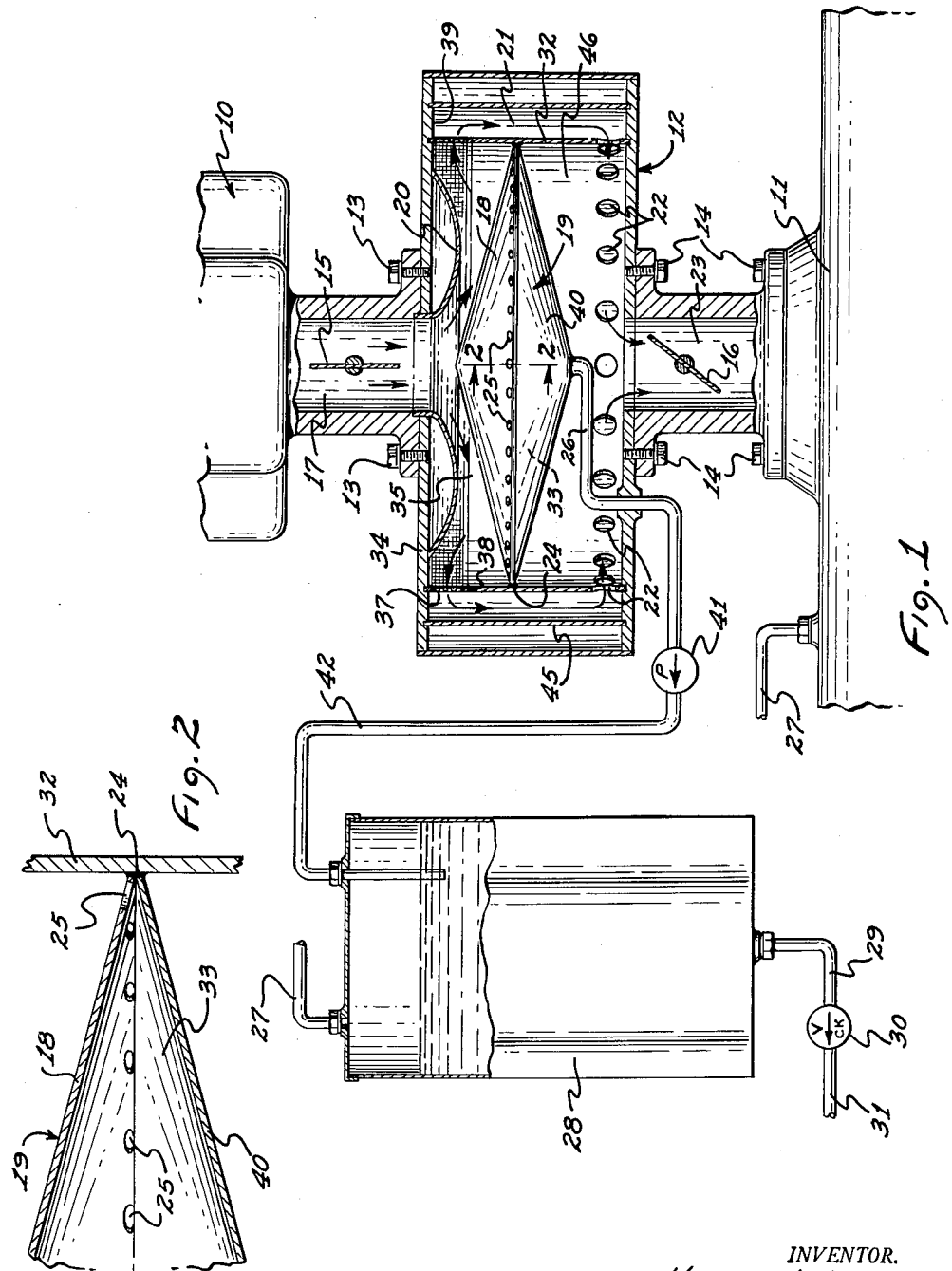
INVENTOR.
HOWARD A. AUSTIN.
BY
Willard S. Grow
ATTORNEY.

United States Patent Office 2,977,205
Patented Mar. 28, 1961

2,977,205
FUEL ECONOMIZER FOR INTERNAL COMBUSTION ENGINES

Howard A. Austin, 1324 W. Maryland, Phoenix, Ariz.

Filed Jan. 26, 1959, Ser. No. 789,071

2 Claims. (Cl. 48—180)

This invention pertains to improvements in a fuel economizer for internal combustion engines and is particularly directed to a device to be placed between the carburetor and intake manifold of the engine to separate the liquid from the gaseous fuel delivered by the carburetor.

One of the objects of this invention is to provide a device of the above character which prevents liquid fuel from being delivered by a carburetor to the intake manifold of an internal combustion engine.

Another object is to provide a device for recovering the liquid fuel delivered by a carburetor of an internal combustion engine.

And a still further object of this invention is to provide a device as above recited which separates the liquid fuel from the gaseous fuel being delivered by a carburetor of an internal combustion engine and to return the liquid fuel to the fuel tank of the engine.

Further features and advantages of this invention will appear from a detailed description of the drawings in which:

Fig. 1 is a diagrammatic view partly in section of a fuel economizer incorporating the features of this invention.

Fig. 2 is an enlarged fragmentary sectional view of a portion of the fuel economizer on the line 2—2 of Fig. 1.

As an example of one embodiment of this invention there is shown an internal combustion engine intake manifold 11 and a carburetor 10 between which is placed the novel unit of this invention comprising a main housing 12 which is connected by bolts 13 to the carburetor 10 and by bolts 14 to the manifold 11. The ordinary butterfly valve 15 of the carburetor 10 is rendered inoperative and held in full open position while a control butterfly valve 16 is utilized in the unit 12.

Fuel enters the unit 12 through the carburetor passageway 17 in the form of liquid droplets, vapors and gaseous material and flows downwardly and impinges against the top outwardly and downwardly sloping conical surface 18 of the double conical baffle 19. The outer edge or circumference 24 of the baffle 19 is secured to the bore of the cylindrical baffle 32. Holes 25 are formed in the upper surface 18 of the baffle member 19 communicating with hollow interior 33 of the baffle member 19. Depending from the top 34 of the main housing 12 is the annular downwardly hanging baffle 20 forming with the top conical surface 18 of the baffle 19 a venturi passageway at 35 therebetween. The cylindrical baffle 32 is secured to the bottom 36 of the main housing 12 and a fine mesh screen 37 extends around the upper edge 38 of the cylindrical baffle to the underside 39 of the top 34 of the main housing 12. An annular passageway 21 is formed between the cylindrical baffle 32 and a heat jacket cylindrical baffle 45 which passageway 21 communicates through the openings 22 with the chamber 46 formed by lower conical member 40 of the baffle 19 and the cylindrical baffle 32. A drain line 26 is connected to the hollow interior 33 of the baffle 19 at the apex of the lower conical member 40 and is connected to the intake of a fuel pump 41 which discharges out through a line 42 to the reservoir 28. A vacuum line 27 is connected to the manifold 11 of the engine while a line 29 is connected to the bottom of the reservoir 28 through a check valve 30 and line 31 for return of liquid fuel to the fuel tank for the engine.

As the mixture of liquid droplets and gaseous fuel impinges on the upper conical surface 18 of the baffle 19 upon opening of the butterfly valve 16, the liquid droplets adhere thereto and liquid runs down the conical surface to the holes 25 then into the hollow interior 33 and finally out through the line 26, the pump 41 and the line 42 to the reservoir 28. The gaseous fuel passes outwardly through the venturi passageway where all liquid droplets are pressed out and then upwardly and out through the screened opening 37 into the annular passageway 21, out through openings 22, into chamber 39 and finally out through discharge passageway 23 to the intake manifold 11.

By providing a separation of the gaseous fuel from the liquid fuel particles as above described for an internal combustion engine, the liquid fuel is constantly returned to the fuel reservoir while only the fully vaporized fuel enters the engine resulting in high fuel economy and power efficiency for the engine.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appended claims are intended to be included herein.

Having thus fully set forth and described this invention what is claimed and desired to be obtained by United States Letters Patent is:

1. A fuel economizer for an internal combustion engine having an intake manifold and a carburetor, said fuel economizer comprising a main housing mounted between said manifold and said carburetor having a carburetor passageway and a discharge passageway, a baffle in said main housing consisting of two hollow truncated cones, one inverted above the other and positioned so that the outer circumferences of the cones are aligned one above the other and the edges sealed so as to form a single hollow unitary structure, a cylindrical baffle having a bore supported on the bottom of said main housing having a bore supportingly engaging said outer circumfences of said truncated cones and sealed therewith to collect unvaporized fuel, holes in the upper one of said truncated cones adjacent said outer circumferences where sealed with the bore of said cylindrical baffle and communicating with the hollow interior of said baffle, a drain line connected between the hollow interior of said baffle at the apex of the lower inverted truncated cone and a fuel reservoir, a downwardly hanging baffle in the top of said main housing forming a circular venturi passageway with the exterior of said upper truncated one of said baffle, and means connecting said venturi passageway to the discharge passageway of said main housing.

2. In a fuel economizer as set forth in claim 1 wherein said last mentioned means includes a screened passageway between the top edge of said cylindrical baffle and the top of said main housing, an annular passageway formed in said main body around said cylindrical baffle, and openings in the bottom of said cylindrical baffle communicating with the chamber formed by said inverted truncated cone of said baffle and the bottom of said main housing, said last mentioned chamber communicating with said discharge passageway of said main housing.

References Cited in the file of this patent

UNITED STATES PATENTS

| | | |
|---|---|---|
| 1,092,279 | Martin et al. | Apr. 7, 1914 |
| 1,139,747 | Bayley | May 18, 1915 |
| 1,813,637 | Powers | July 7, 1931 |
| 2,582,389 | McDonnell | Jan. 15, 1952 |